(12) United States Patent
Gow et al.

(10) Patent No.: US 8,471,407 B2
(45) Date of Patent: Jun. 25, 2013

(54) SPRING-POWERED EMERGENCY ELECTRICAL SUPPLY

(76) Inventors: Thomas W. Gow, Elkton, SD (US);
Edward L. Schwarz, Minneapolis, MN (US)

(*) Notice: Subject to any disclaimer, the term of this patent is extended or adjusted under 35 U.S.C. 154(b) by 294 days.

(21) Appl. No.: 12/771,787

(22) Filed: Apr. 30, 2010

(65) Prior Publication Data

US 2010/0276999 A1 Nov. 4, 2010

Related U.S. Application Data

(60) Provisional application No. 61/174,209, filed on Apr. 30, 2009.

(51) Int. Cl.
*H01F 1/00* (2006.01)
*H01F 3/00* (2006.01)
*H02J 1/16* (2006.01)
*H02J 3/30* (2006.01)

(52) U.S. Cl.
USPC ............. 307/68; 307/43; 307/66; 307/72; 322/28; 322/29; 322/44; 322/46; 322/71; 363/32; 363/73; 363/164; 363/178

(58) Field of Classification Search
USPC ................................. 307/68, 44–46
See application file for complete search history.

(56) References Cited

U.S. PATENT DOCUMENTS

| 5,630,155 | A | * | 5/1997 | Karaki et al. | 713/340 |
|---|---|---|---|---|---|
| 7,205,732 | B1 | * | 4/2007 | Gold | 318/142 |
| 7,566,990 | B2 | * | 7/2009 | Loucks et al. | 307/64 |
| 7,723,863 | B2 | * | 5/2010 | Johnson et al. | 307/23 |
| 2005/0217653 | A1 | * | 10/2005 | Christopher et al. | 124/41.1 |

* cited by examiner

*Primary Examiner* — Rexford Barnie
*Assistant Examiner* — Toan Vu
(74) *Attorney, Agent, or Firm* — Nawrocki, Rooney & Sivertson, P.A.

(57) ABSTRACT

An emergency power system for operation during loss of power on power mains comprises a spring-driven energy storage unit (ESU) and a generator. The ESU enters a generator mode responsive to a power outage state of a power sensor, during which mode unwinding of the spring drive powers the generator. After power is restored to the mains, a preferred embodiment automatically rewinds the spring using the generator as a motor.

10 Claims, 3 Drawing Sheets

SPRING-POWERED EMERGENCY ELECTRICAL SUPPLY

CROSS-REFERENCE TO RELATED APPLICATIONS

This is a regular application filed under 35 U.S.C. §111(a) claiming priority, under 35 U.S.C. §119(e)(1), of provisional application Ser. No. 61/174,209, previously filed Apr. 30, 2009 under 35 U.S.C. §111(b).

BACKGROUND OF THE INVENTION

Power outages potentially create unsafe conditions within buildings. Spaces that have no natural light are difficult for people to move in during power outages. If the power outage is a result of some other dangerous condition such as a fire or an earthquake, not only must the halls be lit, but exit signs must remain illuminated as well. Accordingly, both safety codes and common sense require that some sort of backup power be available to provide for at least tens of minutes, power to these safety-critical devices.

Rechargeable batteries are the industry standard for backup power sources. They are relatively compact and have storage capacity to provide operating power for signs or lights for at least as long codes require. But batteries are not environmentally friendly, require recharging at regular intervals, and eventually deteriorate to the point of requiring replacement.

The potential for deterioration of such batteries requires their periodic testing to assure that they can provide adequate emergency power. The need for this testing is itself a further disadvantage of battery backup power.

Accordingly, a backup power unit that provides adequate backup power, requires no periodic charging, has an indefinite service life, and quickly indicates if the unit has failed, would be a boon to building managers.

BRIEF DESCRIPTION OF THE INVENTION

An emergency power system for operation during loss of power on power mains comprises a spring-driven energy storage unit that enters a generator mode responsive to a power outage state of a power sensor. A generator is connected to receive mechanical power from the energy storage unit and provide electrical power when receiving mechanical power.

A power sensor in mechanical connection to the energy storage unit and electrical connection to the power mains enters the power outage state responsive to loss of power on the power mains. A load is connected to receive electrical power from the generator and provide a human-discernable output.

A preferred spring-driven energy storage unit may further comprise a frame, a rewind spool mounted for rotation on the frame, and a discharge spool mounted for rotation on the frame and in transverse alignment with the storage spool.

This energy storage unit further comprises an elastically bendable spring strip attached at a first end to the rewind spool and at a second end to the discharge spool, and spirally wound on at least one of the rewind and discharge spools. The spring strip has a set urging rotation of the spools to pay portions of the strip wound on the rewind spool, onto the discharge spool. A mechanical connection between one of the rewind and discharge spools and the generator may provide torque to the generator.

The power sensor of the energy storage unit may comprise a solenoid connected to receive power from the power mains. The solenoid holds the energy storage unit in a ready state responsive to receiving power from the power mains. The solenoid enters the power outage state responsive to loss of power on the power mains, responsive to which the energy storage unit enters the generator state.

The generator of the emergency power system may have a motor mode of operation, during which mode the generator receives electrical power from the power mains and applies torque to the rewind spool to wind the spring strip from the discharge spool to the rewind spool.

The emergency power system may include a circuit for measuring electrical continuity between the two ends of the spring strip, and operate a status indicator responsive to continuity between the two ends of the spring strip.

DETAILED DESCRIPTION OF THE INVENTION

Figures 1, 1A:
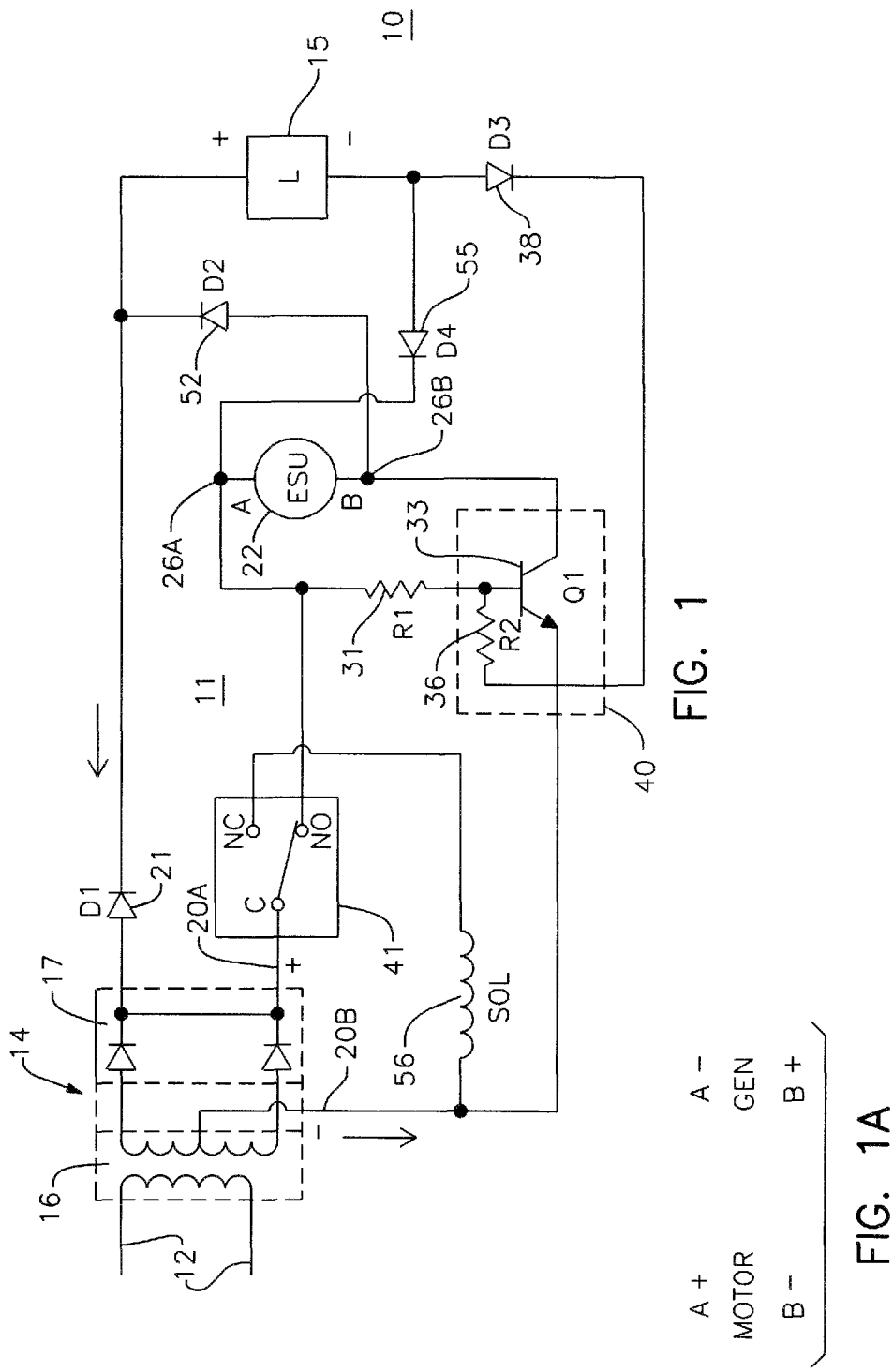
FIGS. 1 and 1A show details of a circuit/block diagram for an emergency power system.

FIG. 1 shows a circuit/block diagram for an emergency power system 10 for a load 15 that requires constant electrical power, such as an "EXIT" sign. A control circuit 11 controls the operation of system 10, and in particular, the operation of a spring-driven energy storage unit (ESU) 22. ESU 22 has two electrical terminals 26A and 26B.

A transformer 16 and a full wave bridge rectifier 17 comprise a power supply 14. Transformer 16 receives line power from the building mains 12 on a primary winding. Transformer 16 has a center tap secondary winding that steps the line power voltage down to a value such as 12 v. for rectifier 17. Rectifier 17 provides low voltage unregulated DC voltage on terminals 20A (+) and 20B (−) for powering load 15, a solenoid 56, and an optional status indicator 54 (FIG. 4), whose purpose will be explained.

When normal power is present on building mains 12, system 10 uses power that power supply 14 provides to operate load 15. When a power outage occurs, system 10 uses ESU 22 to provide emergency electrical power to operate load 15. Control circuit 11 selects the source for load 15 power.

ESU 22 has three operating modes: a generator mode during a power outage, a motor mode while rewinding ESU 22 immediately after power is restored following a power outage, and a ready mode at all other times. In the ready mode, ESU 22 is ready to enter generator mode when a power outage occurs.

Figure 2:
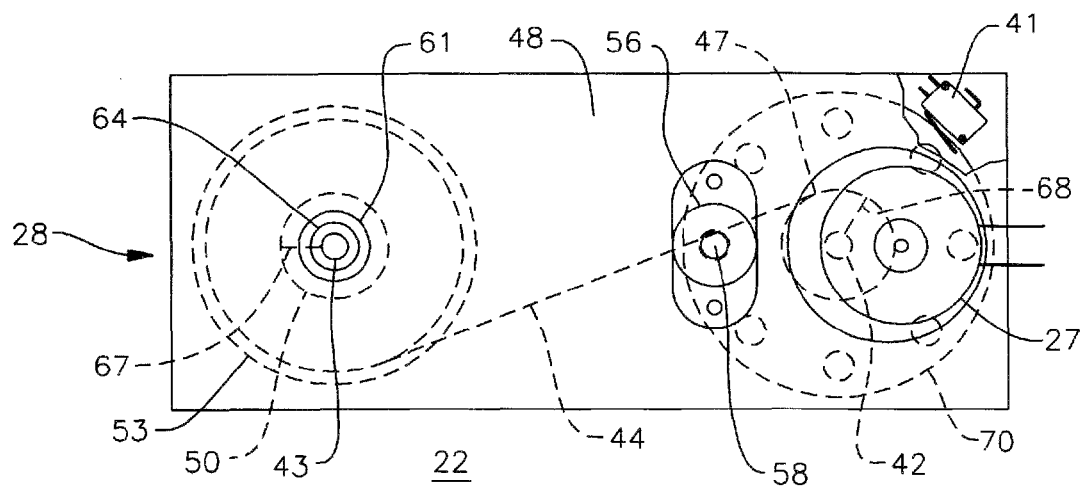
FIGS. 2-4 show details of a spring-powered energy storage unit for the emergency power system.
Figure 3:
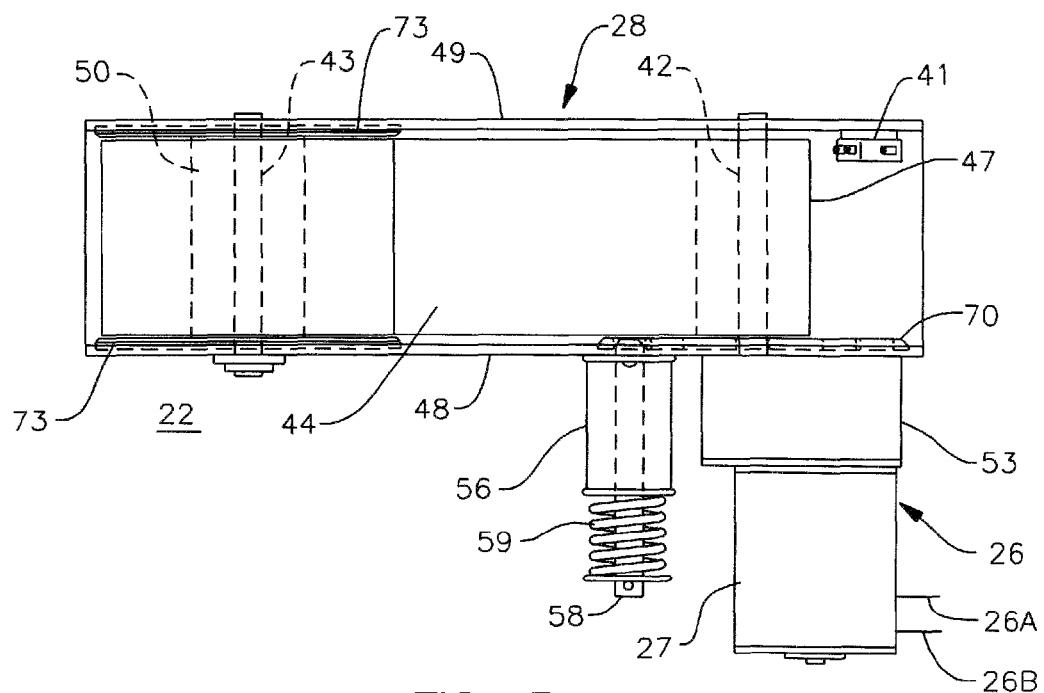
Figure 4:
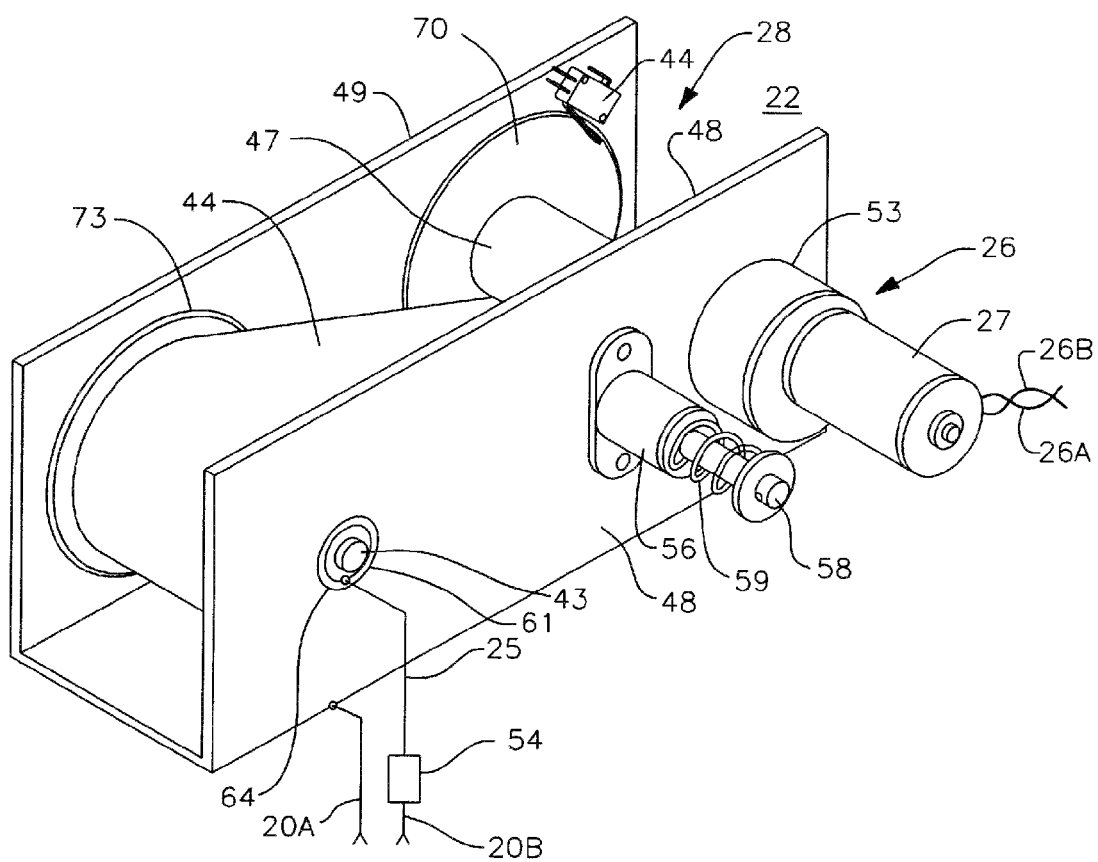

FIGS. 2-4 show ESU 22 as including a mechanical energy storage element 28 including a spiral wound strip spring 44, and a motor-generator unit (MGU) 26 in mechanical connection with storage element 28. MGU 26 operates in generator mode when receiving torque from storage element 28 and in motor mode while rewinding storage element 44 receiving electrical power after a power outage. MGU 26 includes a gear train 53 and a motor 27 that can operate in generator mode when receiving torque. Storage element 28 also includes a rewind spool 47 and a discharge spool 50 for holding wound and unwound portions of spring 44 respectively.

In generator mode, which occurs during power outages, storage element 28 drives MGU 26 to produce power on terminals 26A and 26B. In motor mode, MGU 26 provides rewind torque to storage element 28 to reset storage element 28 to a fully wound condition following a power outage.

A suitable spring 44 for storage element 28 can store sufficient energy to drive an MGU 26 providing electrical power output adequate for operating a load 15 drawing in the range of 3-10 wt. for well over an hour. An ESU 22 having such a storage element 28 and MGU 26 is compact enough to fit in a variety of locations near such loads.

FIGS. 2-4 show details of such an ESU 22. One available storage element 28 design provides substantially constant power output in the range of 5-10 wt. for over an hour.

Various circuit elements of FIG. 1 comprise the control circuit 11 that controls operation of ESU 22. This circuit 11 activates ESU 22 when a power outage occurs to supply power to load 15. Circuit 11 also controls rewinding of storage element 28 after power from mains 12 is again available. FIG. 1A shows the polarity for ESU 22 terminals 26A and 26B while operating in the motor and generator modes.

When power is present on mains 12, power supply 14 provides operating power to load 15 through diode D1 21 and diode D3 38. In this situation, SPDT status switch 41 connects its normally closed (NC) terminal to the common (C) terminal. The common terminal of switch 41 connects to the positive terminal 20A of power supply 17. Switch 41 has a snap action so that either the NO or NC terminal connects to the common terminal C.

Switch 41 conducts DC voltage from power supply 14 to a winding of solenoid 56. Solenoid 56 is in mechanical connection to storage element 28 and cooperates with control circuit 11 to control operation of storage element 28 Solenoid 56 and power supply 14 cooperate to form a power sensor that senses the presence of voltage on mains 12. When power on mains 12 is present, solenoid 56 holds storage element 28 in a fully wound, ready mode. In the ready mode, storage element 28 is ready to provide mechanical energy to MGU 26.

When electric power is lost in the building, mains 12 no longer carry power and power supply 14 ceases to provide operating power to load 15. Further, switch 41 no longer conducts voltage to solenoid 56. Solenoid 56 releases storage element 28, and ESU 22 enters the generator mode and provides operating torque to MGU 26.

As spring 44 unwinds, MGU 26 functions as a generator to provide voltage with the A terminal 26A thereof negative and the B terminal 26B positive. Current flows from B terminal 26B through a D2 diode 52 to load 15, and then through a D4 diode 55 to A terminal 26A. Also while spring 44 unwinds, switch 41 changes state, connecting the NO terminal thereof to the C common terminal.

After line power again appears on mains 12, controller circuit 11 causes MGU 26 to rewind spring 44. Switch 41 with the NO terminal and the common terminal connected, connects A terminal 26A of MGU 26 within ESU 22 to + terminal 20A of power supply 14. At the same time, a voltage divider comprising R1 resistor 31 and R2 resistor 36 forward biases a Q1 power transistor 33 into conduction. R1 resistor 31 and R2 resistor 36 can each be quite large. When Q1 transistor 33 conducts, B terminal 26b of ESU 22 is connected to − terminal 20B of power supply 14. MGU 26 then operates as a motor with current flow through MGU 26 in the direction opposite from when MGU 26 functions as a generator. This causes MGU 26 to rotate in the opposite direction from when MGU 26 functions as a generator, rewinding spring 44.

Eventually, spring 44 winds fully. That condition causes switch 41 to switch so that the NC terminal connects to the C common terminal. This reenergizes solenoid 56, which then holds storage element 28 in the ready mode, and disconnects ESU 22 from power supply 14.

FIGS. 2-4 show details of one version of an ESU 22 usable with the controller circuit 11 of FIG. 1. Spring 44 in storage element 28 comprises a long strip of spring steel that is helically or spirally wound on discharge spool 50 and rewind spool 47. A first end of strip 44 is attached to discharge spool 50 which is mounted on and rotates with a metal shaft 43. A second end of strip 44 is attached to rewind spool 47 which is mounted on and rotates with shaft 42. Spring 44 has a set so that the portion of it on rewind spool 47 is elastically bent from an unstressed shape. Metal side walls 48 and 49 support shafts 42 and 43 for rotation.

Wall 48 also supports solenoid 56. Solenoid 56 includes an armature 58 in the form of a plunger. A spring 59 biases armature 58 toward a disengaged position with the end of armature 58 within spring 59 extended maximally. A stop (not shown) holds armature 58 against the force of spring 59 in the disengaged position. When receiving power, solenoid 56 overcomes the force of spring 59 and presses armature 58 toward a disk 70.

Rewind spool 47 has fixed to it, a disk 70 with a number of peripheral holes in radial alignment with armature 59 of solenoid 56. When solenoid 56 receives voltage from power supply 14, armature 59 is forced toward disk 70. As spool 47 rotates with solenoid 56 energized, one of the peripheral holes in disk 70 will align with armature 58, whereupon armature 58 will enter that hole in disk 70, locking storage element 28 in the ready mode.

The MGU 26 comprises a motor 27 having a shaft and a gear reduction drive or gear train 53 having low and high speed shafts. Motor 27 is of the type that can function as both a motor that provides torque on its shaft when receiving voltage, and when receiving torque at its shaft, a generator. Shaft 42 of spool 47 directly connects to the low speed shaft of gear train 53. The motor 27 shaft connects to the high speed shaft of gear train 53. The overall ratio of gear train 53 causes motor 27 to rotate at a speed 10 times or more that of shaft 42.

The steel strip spring 44 preferably is of the type that generates substantially constant torque on shaft 42 while unwinding from rewind spool 47 onto discharge spool 50. Suitable spools 47 and 50 may have 1 in. diameters and be wide enough to hold a 2 in. wide strip forming spring 44.

Spring 44 may be on the order of 2 in. wide, from 1000-2000 ft. long, and 0.005 in. thick, with a permanent set relieved by winding from spool 47 onto spool 50. Spring 44 thickness of 0.005 in. results in a fully wound diameter of a suitable spring 44 from 6-10 in. Spring 44 may comprise a high carbon or stainless spring steel.

Such a spring 44 when unwinding from fully wound can provide a total output of perhaps 300-600 wt. hr. This capacity will allow ESU 22 to power a load 15 comprising LEDs consuming from 3-10 wt. for a period of an hour or longer, which meets safety codes for safely lighting a hall or illuminating an emergency sign.

In the ready mode, solenoid 56 receives power from power supply 14 that holds the armature in the projecting position in a hole in disk 70. As long as solenoid 56 continues to receive power, storage device 28 remains in the ready mode.

When power on mains 12 is lost, spring 59 is powerful enough to withdraw armature 58 from the hole in disk 70. Solenoid 56 thus serves as a sensor for the status of power on mains 12. Once armature 58 withdraws from disk 70, then storage element 28 enters the operating mode where shaft 42 rotates, and gear train 53 spins motor 27. In operating mode, motor 27 functions as a generator to provide voltage at electrical terminals 26A and 26B (see FIG. 1).

In the ready mode condition, switch 41 connects the NC terminal to the common terminal. As spool 47 rotates and strip 44 pays off onto spool 50, the finger of switch 41 moves until switch 41 changes into the operating mode condition with the NO terminal connected to the common terminal. FIG. 4 shows switch 41 in the operating mode condition.

When power returns to mains 12, controller circuit 11 applies power to motor 27 to operate in motor mode. MGU 26 operates to rotate spool 47 in the rewind direction, where strip 44 pays off spool 50 onto spool 47. Eventually the diameter of the strip 44 on rewind spool 47 is large enough to return switch 41 to the ready mode condition. As explained above, controller circuit 11 then removes power from MGU 26. Thus, switch 41 ends winding of spring strip 44 when fully wound.

When switch 41 changes to the NC state, power switches from MGU 26 to solenoid 56. Disk 70 rotates a fraction of a turn until one of the holes aligns with armature 58. Solenoid 56 drives its armature 58 into that hole against the force of spring 59, locking spool 47 in the ready state, awaiting the next power outage.

One important requirement of any emergency power supply is some type of assurance of proper operation in case of power loss. For batteries, a number of ways exist to determine the current power capacity and level of charge. Experience shows that such batteries generally fail after a few years, requiring replacement which is costly and which generates hazardous waste.

System 10 is believed to remain functional for many years, since all of the components are likely to be long-lived. However, it is possible that experience will show that occasional failures will occur. For system 10, the most likely problem is a broken spring 44 within storage element 28. In this situation, the ability to sense a broken strip 44 is desirable.

A broken spring 44 can be sensed in a number of different ways, but the following describes a currently preferred design. Most often, spring strip 44 will break between spools 47 and 50, and usually close to the completely wound position because that part of spring strip 44 flexes most frequently and thus is most vulnerable.

Measuring the electrical continuity of strip 44 from the end attached to spool 50 to the end attached to spool 47 provides a reliable means for sensing whether strip 44 has broken. FIGS. 2 and 4 show wall 48 supporting a metal sleeve bearing 64 making electric contact with a first end of metal shaft 43. Sleeve bearing 64 is in turn mounted in an insulating bushing 61. A conductive jumper 67 shown in FIG. 2 electrically connects the end of spring 44 to shaft 43. Alternatively, spool 50 may be metal to connect strip 44 to shaft 43. A similar bearing and bushing in wall 49 insulates the second end of shaft 43.

Spool 50 has insulating flanges 73 (see FIG. 3) that electrically isolate the spring strip 44 coil on spool 50 from wall 48. Alternatively, the interior surface of wall 48 may carry an insulating sheet that electrically isolates the coil of spring 44 on spool 50 from wall 48. Thus, the spring strip 44 coil on spool 50 is electrically insulated and isolated from walls 48 and 49. Shaft 42 on the other hand rotates in sleeve bearings that electrically connect shaft 42 with walls 48 and 49.

Conductor 25 (FIG. 4) connects to bearing 64. Power supply terminal 20A connects to wall 48. A status indicator 54 such as a light connects to conductor 25 and power supply terminal 20B. So long as electrical continuity exists between conductors 25, the likelihood is high that spring strip 44 is not broken. Current flows through strip 44 to operate status indicator 54. If continuity between conductors 25 is lost, then spring 44 likely has broken. In this case power no longer flows to indicator 54, warning personnel that the storage device 28 may have malfunctioned.

If experience shows that spring 44 may break within a coil on spool 47 or 50, this mechanism to detect a broken spring 44 is still usable. To detect breaks of spring 44 internal to a coil on either spool 47 or 50, spring 44 may have an insulating coating or sheet on one side that insulates adjacent turns of spring 44 from each other.

Additionally, experience may show that it is necessary to completely insulate the inner surfaces of walls 48 and 49 to prevent inadvertent electrical contact between a broken spring strip 44 on spool 50 and walls 48 and 49. Thin plastic sheets with adhesive on one side may be attached to the interior surfaces of walls 48 and 49 to provide this insulation.

Some embodiments may have improved functionality if the generator and motor are separate devices. In one embodiment, individual generator and motor field windings and a common permanent magnet rotor within a single housing provide this functionality. Advantages are potentially, compactness and reduced cost through sharing a rotor.

Alternatively, the motor and generator may be completely separate units in separate housings sharing a common shaft. Here, advantages may be reduced cost because off-the-shelf devices are available.

A third design may have a relatively high torque motor driving shaft 42 directly, rather than through gear train 53. This embodiment has the potential to rewind spring storage device 28 much more quickly than when winding through gear train 53. The rewind motor will in this case drive through a clutch that provides little or no unwinding resistance.

Normally, power outages are very rare and usually occur randomly. However, investigation may show that occurrences of power outages are not always random. That is, power outages closely spaced in time may sometimes occur, as for example if two or more closely spaced storms affect a geographic area, or if intermittent brownouts occur in an area. In these cases, a building may be reoccupied after the first power outage. If storage device 28 is not fully rewound when the next outage occurs, system 10 may not provide emergency power for the prescribed operating time. In this situation, rapid rewinding of storage device 28 will be valuable.

The invention claimed is:

1. An emergency power system for operation during loss of power on power mains, comprising:
   a) a spring-driven energy storage unit entering a generator mode responsive to a power outage state of a power sensor, and providing mechanical power while the power sensor is in the power outage state;
   b) a generator connected to receive mechanical power from the energy storage unit and providing electrical power when receiving mechanical power;
   c) wherein the power sensor is in mechanical connection to the energy storage unit and electrical connection to the power mains, and enters the power outage state responsive to loss of power on the power mains; and
   d) a load receiving electrical power from the generator and providing a human-discernable output.

2. The emergency power system of claim 1 wherein the spring-driven energy storage unit further comprises:
   a) a frame;
   b) a rewind spool mounted for rotation on the frame;
   c) a discharge spool mounted for rotation on the frame and in transverse alignment with the rewind spool;
   d) an elastically bendable spring strip attached at a first end to the rewind spool and at a second end to the discharge spool, and spirally wound on at least one of the rewind and discharge spools, said spring strip having a set urging rotation of the spools to pay portions of the strip wound on the rewind spool, onto the discharge spool; and e) a mechanical connection between one of the rewind and discharge spools and the generator.

3. The emergency power system of claim 2 wherein the power sensor comprises a solenoid connected to receive power from the power mains, and holding the energy storage unit in a ready state responsive to receiving power from the power mains, said solenoid entering the power outage state responsive to loss of power on the power mains, responsive to which the energy storage unit enters the generator mode.

4. The emergency power system of claim 3 wherein the generator includes a motor mode of operation, during which mode the generator receives electrical power from the power mains and applies torque to the rewind spool to wind the spring strip from the discharge spool to the rewind spool.

5. The emergency power system of claim 4, including a circuit for measuring electrical continuity between the two ends of the spring strip, and operating a status indicator responsive to continuity between the two ends of the spring strip.

6. The emergency power system of claim 5, wherein one of the rewind and the discharge spools is electrically insulated from the frame.

7. The emergency power system of claim 4, wherein the spring strip has a ready mode when a preselected amount of spring strip is on the rewind spool, and wherein the emergency power system includes a status switch in mechanical connection with the spring strip, and having a first state when the preselected amount of spring strip is on the rewind spool, and a second state otherwise, wherein the status switch when in the second state connects the power mains to the generator to place the generator in the motor mode and rotate the rewind spool to pull portions of the spring strip from the discharge spool to the rewind spool.

8. The emergency power system of claim 2 wherein the power sensor comprises a solenoid connected to receive power directly from the power mains, and holding the energy storage unit in a ready state responsive to receiving power from the power mains, said solenoid entering the power outage state responsive to loss of power on the power mains, responsive to which the energy storage unit enters the generator mode.

9. The emergency power system of claim 8, wherein the solenoid includes an armature holding the energy storage unit in the ready state and a spring biasing the armature to place the solenoid in the power outage state.

10. The emergency power system of claim 3, wherein the solenoid includes an armature holding the energy storage unit in the ready state and a spring biasing the armature to place the solenoid in the power outage state.

* * * * *